US008768898B1

(12) United States Patent
Trimmer et al.

(10) Patent No.: US 8,768,898 B1
(45) Date of Patent: Jul. 1, 2014

(54) PERFORMING DIRECT DATA MANIPULATION ON A STORAGE DEVICE

(75) Inventors: Don Alvin Trimmer, Sunnyvale, CA (US); Sandeep Yadav, Sunnyvale, CA (US); Pratap Singh, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 901 days.

(21) Appl. No.: 11/740,471

(22) Filed: Apr. 26, 2007

(51) Int. Cl.
*G06F 17/30* (2006.01)

(52) U.S. Cl.
USPC .......................................................... 707/693

(58) Field of Classification Search
None
See application file for complete search history.

(56) References Cited

U.S. PATENT DOCUMENTS

| | | | | |
|---|---|---|---|---|
| 6,041,334 | A * | 3/2000 | Cannon | 707/652 |
| 6,356,863 | B1 * | 3/2002 | Sayle | 703/27 |
| 6,631,514 | B1 * | 10/2003 | Le | 717/137 |
| 6,650,656 | B2 | 11/2003 | Tyndall | |
| 7,016,982 | B2 | 3/2006 | Basham | |
| 7,707,374 | B2 * | 4/2010 | Kisley et al. | 711/162 |
| 2003/0084075 | A1 * | 5/2003 | Balogh et al. | 707/204 |
| 2003/0208529 | A1 * | 11/2003 | Pendyala et al. | 709/203 |
| 2005/0188151 | A1 * | 8/2005 | Lee | 711/112 |
| 2005/0216492 | A1 * | 9/2005 | Singhal et al. | 707/100 |
| 2006/0080370 | A1 * | 4/2006 | Torii et al. | 707/204 |
| 2007/0030734 | A1 * | 2/2007 | Sinclair et al. | 365/185.11 |
| 2007/0061540 | A1 * | 3/2007 | Rafert et al. | 711/170 |
| 2007/0078950 | A1 * | 4/2007 | Hopkins et al. | 709/217 |
| 2007/0094354 | A1 * | 4/2007 | Soltis | 709/218 |
| 2007/0156842 | A1 * | 7/2007 | Vermeulen et al. | 709/217 |
| 2007/0160067 | A1 * | 7/2007 | Hayward | 370/397 |
| 2007/0174580 | A1 * | 7/2007 | Shulga | 711/170 |
| 2007/0220027 | A1 * | 9/2007 | Richey et al. | 707/101 |
| 2007/0294308 | A1 * | 12/2007 | Megerian | 707/200 |
| 2008/0162890 | A1 * | 7/2008 | Sathaye | 712/218 |
| 2008/0208806 | A1 * | 8/2008 | Dalfo et al. | 707/3 |
| 2008/0270688 | A1 * | 10/2008 | Kodama et al. | 711/113 |
| 2011/0302383 | A1 * | 12/2011 | Ignatius et al. | 711/162 |

OTHER PUBLICATIONS

Mysql Manual http://web.archive.org/web/20060103042958/dev.mysql.com/doc/refman/4.1/en/select.html and http://web.archive.org/web/20060101025717/dev.mysql.com/doc/refman/4.1/en/logical-operators.html as of Jan. 2006.*
Pizzini et al Sed, A Stream Editor, Published Jan. 2006, accessed at http://ischeriad.de/linux/sed-manual-4.1.5.pdf.*
Nixcraft, Running Command on a Remote Linux / UNIX Host, Published Jul. 25, 2005, http://www.cyberciti.biz/tips/linux-running-commands-on-a-remote-host.html.*
DD Manual Page, Published Jun. 2002, http://www.netadmintools.com/html/dd.man.html.*

(Continued)

*Primary Examiner* — Kevin L Young
(74) *Attorney, Agent, or Firm* — Perkins Coie LLP (57) ABSTRACT

A method and system for performing data manipulation on a storage device is disclosed. A data manipulation command is created on a computing device, wherein the computing device is separate from the storage device. The computing device is a client or a server that requests services of a storage system to store data on a storage medium. The computing device and the storage device are connected over a network. The computing device executes a host application, and its data is stored on the medium. The computing device issues a command to the storage device to be performed on the data. The storage device executes the command and sends the result to the computing device. As a result, the data is not sent to the computing device for manipulation.

36 Claims, 7 Drawing Sheets

(56) References Cited

OTHER PUBLICATIONS

Merriam-Webster definition of explicit as of Jun. 3, 2006 http://web.archive.org/web/20060603154610/http://merriam-webster.com/dictionary/explicit.*

Notenboom, Why isn't my outlook PST getting smaller after deleting emails as of Feb. 26, 2007 http://web.archive.org/web/20070226205647/http://ask-leo.com/why_isnt_my_outlook_pst_getting_smaller_after_deleting_emails.html.*

SCSI Extended Copy Command, Working Draft, T10/99-143r1, Apr. 2, 1999.

* cited by examiner

PERFORMING DIRECT DATA MANIPULATION ON A STORAGE DEVICE

FIELD OF INVENTION

The present invention generally relates to networked storage, and more particularly, to a method and system for directly manipulating data on a storage device.

BACKGROUND

A data storage system is a computer and related storage medium that enables storage or backup of large amounts of data. Storage systems, also known as storage appliances or storage servers, may support a network attached storage (NAS) computing environment. A NAS is a computing environment where file-based access is provided through a network, typically in a client/server configuration. A storage server can provide clients with a block-level access to data stored in a set of mass storage devices, such as magnetic or optical storage disks.

A file server (also known as a "filer") is a computer that provides file services relating to the organization of information on storage devices, such as disks. The filer includes a storage operating system that implements a file system to logically organize the information as a hierarchical structure of directories and files on the disks. Each "on-disk" file may be implemented as a set of disk blocks configured to store information, whereas the directory may be implemented as a specially-formatted file in which information about other files and directories are stored. A filer may be configured to operate according to a client/server model of information delivery to allow many clients to access files stored on the filer. In this model, the client may include an application, such as a file system protocol, executing on a computer that connects to the filer over a computer network. The computer network can include, for example, a point-to-point link, a shared local area network (LAN), a wide area network (WAN), or a virtual private network (VPN) implemented over a public network such as the Internet. Each client may request filer services by issuing file system protocol messages (in the form of packets) to the filer over the network.

A common file system type is a "write in-place" file system, in which the locations of the data structures (such as inodes and data blocks) on a disk are typically fixed. An inode is a data structure used to store information, such as metadata, about a file, whereas the data blocks are structures used to store the actual data for the file. The information contained in an inode may include information relating to ownership of the file, access permissions for the file, the size of the file, the file type, and references to locations on disk of the data blocks for the file. The references to the locations of the file data are provided by pointers, which may further reference indirect blocks. Indirect blocks, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another file system type is a write-anywhere file system that does not overwrite data on disks. If a data block on a disk is read from the disk into memory and "dirtied" with new data, the data block is written to a new location on the disk to optimize write performance. A write-anywhere file system may initially assume an optimal layout, such that the data is substantially contiguously arranged on the disks. The optimal disk layout results in efficient access operations, particularly for sequential read operations. A particular example of a write-anywhere file system is the Write Anywhere File Layout (WAFL®) file system available from Network Appliance, Inc. The WAFL file system is implemented within a microkernel as part of the overall protocol stack of the filer and associated disk storage. This microkernel is supplied as part of Network Appliance's Data ONTAP® storage operating system, residing on the filer that processes file service requests from network-attached clients.

As used herein, the term "storage operating system" generally refers to the computer-executable code operable on a storage system that manages data access. The storage operating system may, in case of a filer, implement file system semantics, such as Data ONTAP® storage operating system. The storage operating system can also be implemented as an application program operating on a general-purpose operating system, such as UNIX® or Windows®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes.

The disks within a volume can be organized as a Redundant Array of Independent (or Inexpensive) Disks (RAID). RAID implementations enhance the reliability and integrity of data storage through the writing of data "stripes" across a given number of physical disks in the RAID group, and the appropriate storing of parity information with respect to the striped data. In the example of a WAFL® file system, a RAID-4 implementation is advantageously employed, which entails striping data across a group of disks, and storing the parity within a separate disk of the RAID group. As described herein, a volume typically comprises at least one data disk and one associated parity disk (or possibly data/parity) partitions in a single disk arranged according to a RAID-4, or equivalent high-reliability, implementation.

NAS devices provide access to stored data using standard protocols, e.g., Network File System (NFS), Common Internet File System (CIFS), Internet Small Computer System Interface (iSCSI), etc. To manipulate the data stored on these devices, clients have to fetch the data using an access protocol, modify the data, and then write back the resulting modified data. Bulk data processing sometimes requires small manipulations of the data that need to be processed as fast as possible. This process (fetch-modify-write) is inefficient for bulk data processing, as it wastes processor time on protocol and network processing and increases network utilization. The closer the processing is to the stored data, the less time the data processing will take.

Traditional file systems are not particularly adept at handling large numbers (e.g., more than one million) of small objects (e.g., one kilobyte (KB) files). The typical way of addressing this problem is to use a container to hold several of the small objects. However, this solution leads to the problems of how to manage the containers and how to manage the objects within the container. Managing the containers presents the typical file system problems from a higher level in the containers.

In applications that use files for storing a list of records, a deleted record is often marked as "deleted" instead of being physically removed from the file. The file is periodically repacked to purge all of the deleted records and to reclaim space. This process is traditionally carried out by reading the file by an application via NFS, for example; packing the records by the application; and writing the file back to storage via NFS, for example. Again, this process uses the typical fetch-modify-write pattern, which makes the entire repacking process inefficient for the storage device.

Another example of this type of IO-intensive task is reading a file and rewriting the data to another file, with the data being relocated within the destination file. In addition to using resources on the NAS device, this task also incurs a load on the network (sending the file back and forth) and a load on the client that is processing the data.

Figure 1:
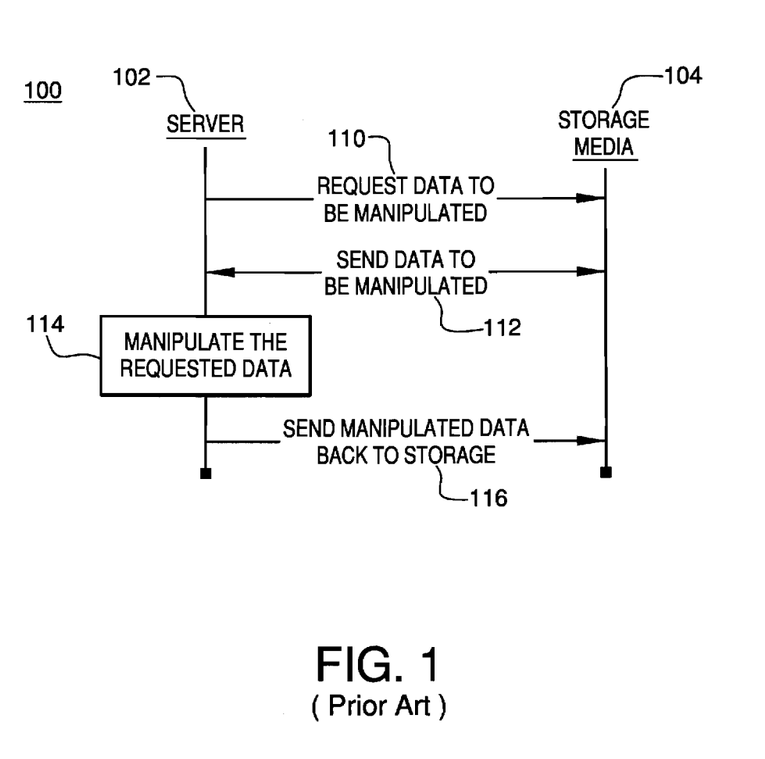
FIG. 1 is a flow diagram of an existing method for manipulating data stored on a storage device.

FIG. 1 is a flow diagram of an existing fetch-modify-write method 100 for manipulating data stored on a storage device. The method 100 operates between a server 102 and a data storage media 104. The server 102 and the data storage media 104 communicate over a network connection. The server 102 requests data to be manipulated from the storage media 104 (step 110). The storage media 104 retrieves the data and sends the data over the network to the server 102 (step 112). The server 102 manipulates the requested data (step 114) and sends the manipulated data back over the network to the storage media 104 (step 116).

As can be seen from FIG. 1, the method 100 requires that the data be sent over the network twice—once from the storage media 104 to the server 102 (step 112) and second from the server 102 to the storage media 104 (step 116).

Accordingly, there is a need for a technique for manipulating data on a storage device that avoids the limitations of the prior art solutions.

SUMMARY

The present invention describes a method and system for performing data manipulation on a storage device. A data manipulation command is created on a computing device, wherein the computing device is separate from the storage device. The computing device is a client or a server that requests services of a storage system to store data on a storage medium. The computing device and the storage device are connected over a network. The computing device stores a host application, and its data is stored on the medium. The computing device issues a command to the storage device to be performed on the data. The storage device executes the command and sends the result to the computing device.

The present invention provides advantages over existing solutions. Several of these advantages are described below by way of example. First, data manipulation performance is accelerated by moving the command execution as close to the data as possible. Second, because all of the data remains on the storage device, there is no network utilization in transmitting the data to and from the computer that requested the manipulation. Third, the requesting computer is not required to expend processing power to manipulate the data.

The present invention describes a set of high level commands that can be built for data manipulation and a mechanism to send the commands to the storage device. An exemplary command set may include input/output (IO) instructions (e.g., relocate, remove, etc.) that can be executed on the storage device. Each instruction has its own descriptor and a set of parameters that are relevant to it, e.g., a relocate instruction requires the following inputs: a range of data to relocate, the source of the data, and destination for the data. A logical data manipulation event can be composed of many such instructions. The instructions are composed and packed by the initiator of the event and sent to the target storage device over the network. The target storage device unpacks the instructions and executes the instructions in a data optimized manner to arrive at the final result. The set of commands is evaluated for correctness, the commands are executed, and the results are returned.

BRIEF DESCRIPTION OF THE DRAWINGS

A more detailed understanding of the invention may be had from the following description of preferred embodiments, given by way of example, and to be understood in conjunction with the accompanying drawings, wherein.

DETAILED DESCRIPTION OF THE PREFERRED EMBODIMENTS

Network Environment

Figure 2:
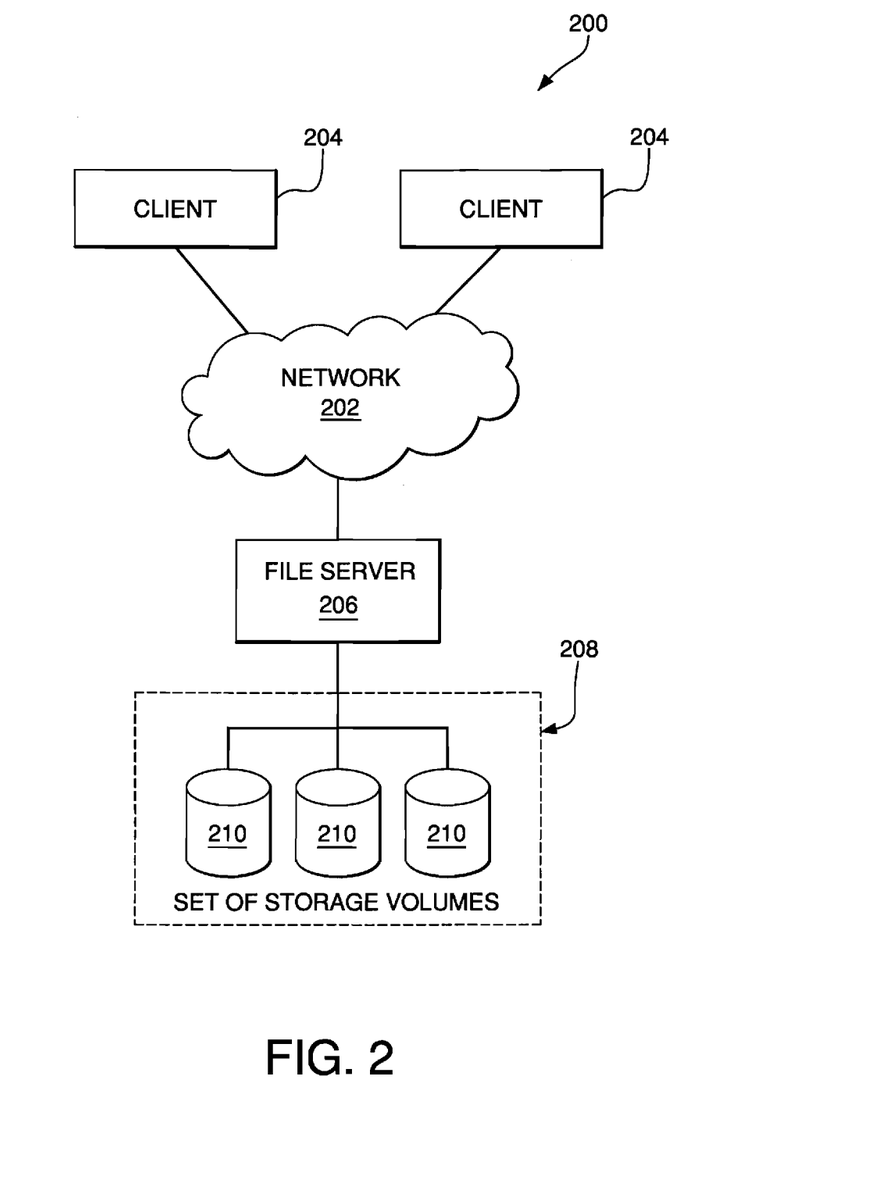
FIG. 2 is a block diagram of a network environment in which the present invention can be implemented.

FIG. 2 is a block diagram of an exemplary network environment 200 in which the principles of the present invention are implemented. The environment 200 includes a number of clients 204 connected to a file server 206 over a network 202. The network 202 can be a local area network (LAN), a wide area network (WAN), a virtual private network (VPN) using communication links over the Internet, for example, or any combination of the three network types. For the purposes of this description, the term "network" includes any acceptable network architecture.

The file server 206, described further below, is configured to control storage of data and access to data that is located on a set 208 of interconnected storage volumes or disks 210. It is noted that the terms "storage volumes" and "disks" can be used interchangeably herein, without limiting the term "storage volumes" to disks. The term "storage volumes" can include any type of storage media, such as tapes or non-volatile memory.

Each of the devices attached to the network 202 includes an appropriate conventional network interface connection (not shown) for communicating over the network 202 using a communication protocol, such as Transport Control Protocol/Internet Protocol (TCP/IP), User Datagram Protocol (UDP), Hyper Text Transport Protocol (HTTP), Simple Network Management Protocol (SNMP), or Virtual Interface (VI) connections.

File Server

Figure 3:
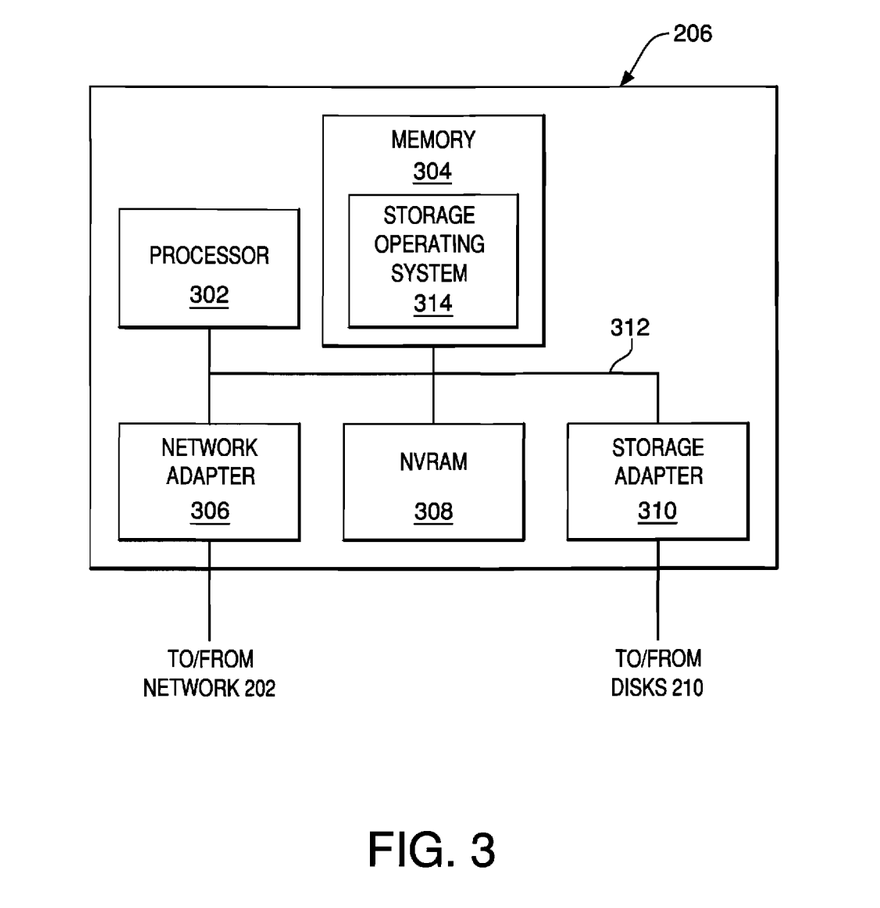
FIG. 3 is a block diagram of the file server shown in FIG. 2.

FIG. 3 is a detailed block diagram of an exemplary file server ("filer") 206. It will be understood by one skilled in the art that the inventive concepts described herein apply to any type of file server, wherever implemented, including on a special-purpose computer, a general-purpose computer, or a standalone computer.

The file server 206 includes a processor 302, a memory 304, a network adapter 306, a nonvolatile random access memory (NVRAM) 308, and a storage adapter 310, all of which are interconnected by a system bus 312. Contained within the memory 304 is a storage operating system 314 that implements a file system to logically organize the information as a hierarchical structure of directories and files on the disks 210. In an exemplary embodiment, the memory 304 is addressable by the processor 302 and the adapters 306, 310 for storing software program code. The operating system 314, portions of which are typically resident in the memory 304 and executed by the processing elements, functionally organizes the filer by invoking storage operations in support of a file service implemented by the filer.

The network adapter 306 includes mechanical, electrical, and signaling circuitry needed to connect the filer 206 to clients 204 over the network 202. The clients 204 may be general-purpose computers configured to execute applications, such as database applications. Moreover, the clients 204 may interact with the filer 206 in accordance with a client/server information delivery model. That is, the client 204 requests the services of the filer 206, and the filer 206 returns the results of the services requested by the client 204 by exchanging packets defined by an appropriate networking protocol.

The storage adapter 310 interoperates with the storage operating system 314 and the disks 210 of the set of storage volumes 208 to access information requested by the client 204. The storage adapter 310 includes input/output (I/O) interface circuitry that couples to the disks 210 over an I/O interconnect arrangement, such as a Fibre Channel link. The information is retrieved by the storage adapter 310 and, if necessary, is processed by the processor 302 (or the adapter 310 itself) prior to being forwarded over the system bus 312 to the network adapter 306, where the information is formatted into appropriate packets and returned to the client 204.

In one exemplary implementation, the filer 206 includes a non-volatile random access memory (NVRAM) 308 that provides fault-tolerant backup of data, enabling the integrity of filer transactions to survive a service interruption based upon a power failure or other fault.

Storage Operating System

To facilitate the generalized access to the disks 210, the storage operating system 314 implements a write-anywhere file system that logically organizes the information as a hierarchical structure of directories and files on the disks. As noted above, in an exemplary embodiment described herein, the storage operating system 314 is the NetApp® Data ONTAP® operating system available from Network Appliance, Inc., that implements the WAFL® file system. It is noted that any other appropriate file system can be used, and as such, where the terms "WAFL®" or "file system" are used, those terms should be interpreted broadly to refer to any file system that is adaptable to the teachings of this invention.

Figure 4:
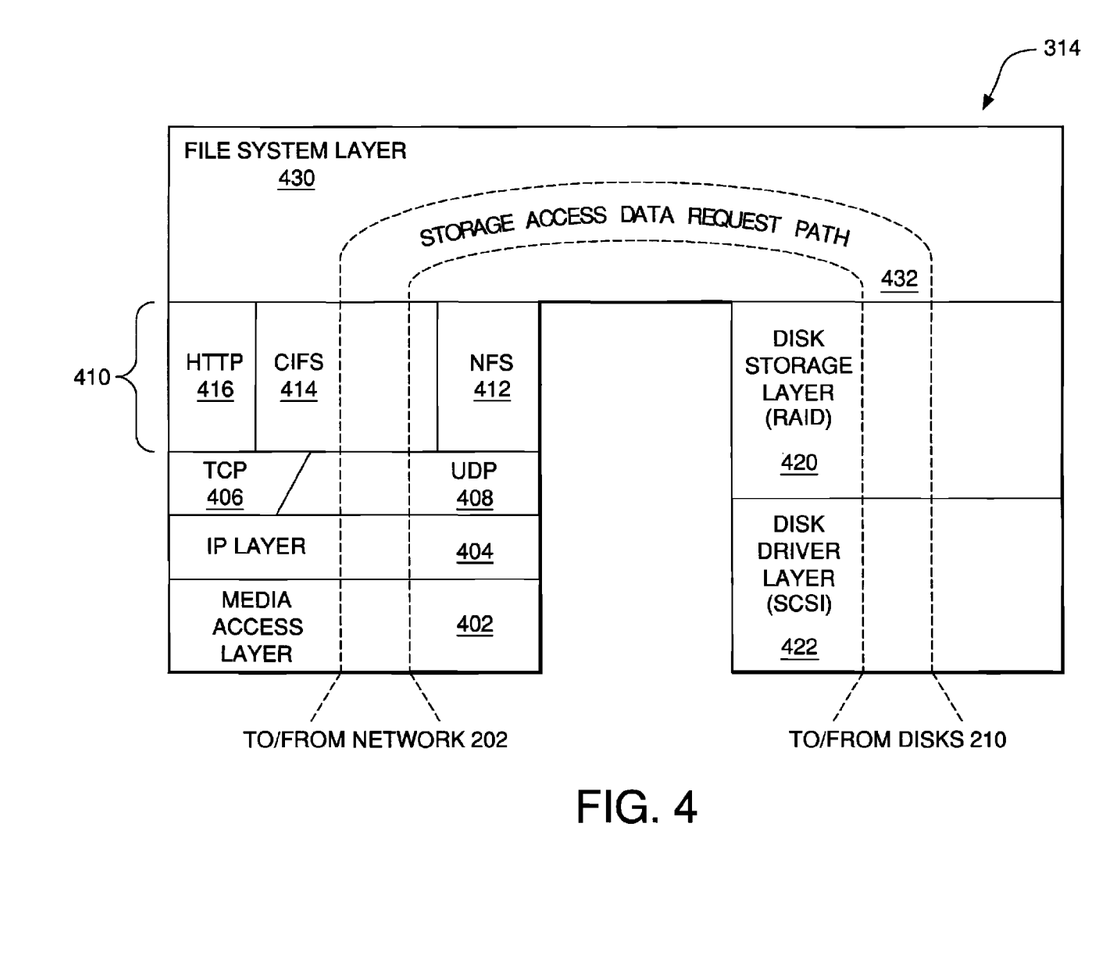
FIG. 4 is a block diagram of the storage operating system shown in FIG. 3.

Referring now to FIG. 4, the storage operating system 314 includes a series of software layers, including a media access layer 402 of network drivers (e.g., an Ethernet driver). The storage operating system 314 further includes network protocol layers, such as an Internet Protocol (IP) layer 404 and its supporting transport mechanisms, a Transport Control Protocol (TCP) layer 406 and a User Datagram Protocol (UDP) layer 408.

A file system protocol layer 410 provides multi-protocol data access and includes support for the Network File System (NFS) protocol 412, the Common Internet File System (CIFS) protocol 414, and the Hyper Text Transfer Protocol (HTTP) 416. In addition, the storage operating system 314 includes a disk storage layer 420 that implements a disk storage protocol, such as a redundant array of independent disks (RAID) protocol, and a disk driver layer 422 that implements a disk access protocol such as, e.g., a Small Computer System Interface (SCSI) protocol.

Bridging the disk software layers 420-422 with the network and file system protocol layers 402-416 is a file system layer 430. Generally, the file system layer 430 implements a file system having an on-disk format representation that is block-based using data blocks and inodes to describe the files.

In the storage operating system 314, a data request path 432 between the network 202 and the disk 210 through the various layers of the operating system is followed. In response to a transaction request, the file system layer 430 generates an operation to retrieve the requested data from the disks 210 if the data is not resident in the filer's memory 304. If the data is not in the memory 304, then the file system layer 430 indexes into an inode file using the inode number to access an appropriate entry and retrieve a logical volume block number. The file system layer 430 then passes the logical volume block number to the disk storage layer 420. The disk storage layer 420 maps the logical number to a disk block number and sends the disk block number to an appropriate driver (for example, an encapsulation of SCSI implemented on a Fibre Channel disk interconnection) in the disk driver layer 422. The disk driver accesses the disk block number on the disks 210 and loads the requested data in the memory 304 for processing by the filer 206. Upon completing the request, the filer 206 (and storage operating system 314) returns a reply, e.g., an acknowledgement packet defined by the CIFS specification, to the client 204 over the network 202.

It is noted that the storage access request data path 432 through the storage operating system layers described above may be implemented in hardware, software, or a combination of hardware and software. In an alternate embodiment of this invention, the storage access request data path 432 may be implemented as logic circuitry embodied within a field programmable gate array (FPGA) or in an application specific integrated circuit (ASIC). This type of hardware implementation increases the performance of the file services provided by the filer 206 in response to a file system request issued by a client 204.

By way of introduction, the present invention provides advantages over existing solutions. Several of these advantages are described below by way of example. First, data manipulation performance is accelerated by moving the command execution as close to where the data is stored as possible. Second, because all of the data remains on the storage device, there is no network utilization in transmitting the data to and from the computer that requested the manipulation. Third, the requesting computer is not required to expend processing power to manipulate the data.

The present invention describes a set of high level commands that can be built for data manipulation and a mechanism to send the commands to the storage device. An exemplary command set may include IO instructions (e.g., relocate, remove, etc.) that can be executed on the storage device. Each instruction has its own descriptor and a set of parameters that are relevant to it, e.g., a relocate instruction requires the following inputs: a range of data to relocate, the source of the data, and destination for the data. A logical data manipulation event can be composed of many such instructions. The instructions are composed and packed by the initiator of the event and sent to the target storage device over the network. The target storage device unpacks the instructions and executes the instructions in a data optimized manner to arrive at the final result. As discussed in greater detail below, the concept of a "data optimized manner" can include the storage device reordering the instructions to improve (e.g., speed up) the performance of the instructions. The set of commands is evaluated for correctness, the commands are executed, and the results are returned.

In an exemplary embodiment, the present invention is implemented as an application executing on a computer operating system. For example, the storage device can include the NearStore® storage system running the NetApp® Data ONTAP® operating system available from Network Appliance, Inc. It is noted that the principles of the present invention are applicable to any type of storage device running any type of operating system.

Figure 5:
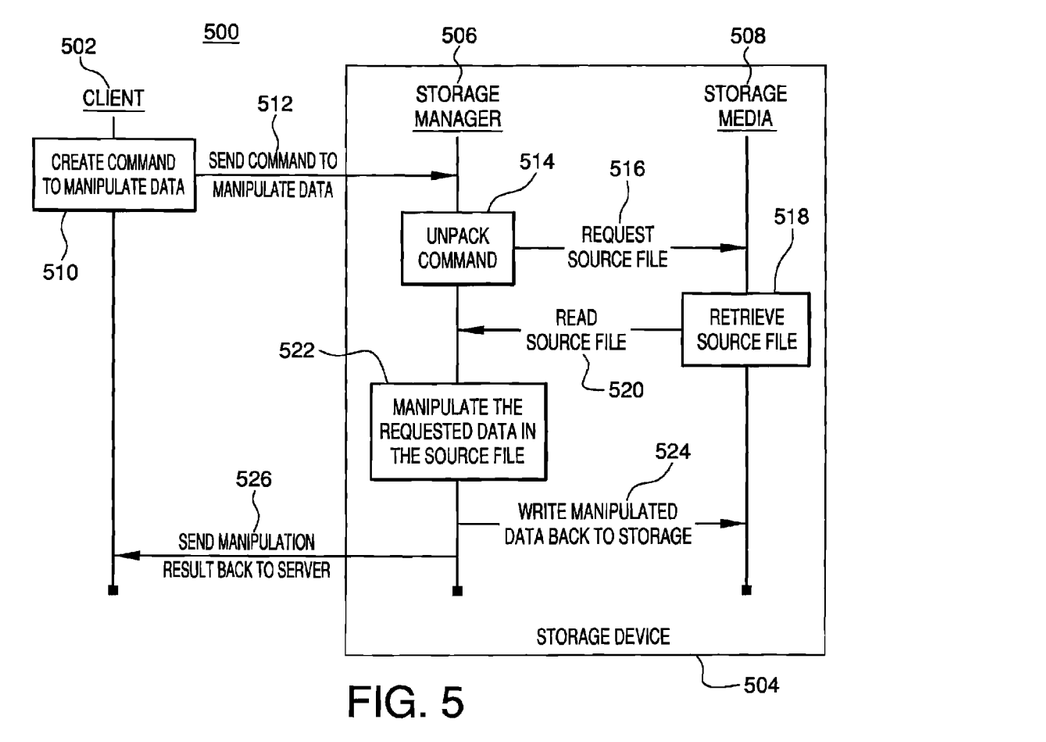
FIG. 5 is a flow diagram of a method for directly manipulating data on a storage device.

FIG. 5 shows a flow diagram of a method 500 for directly manipulating data on a storage device. The method 500 utilizes a client 502 and a storage device 504, which communicate with each other over a network connection. A person of ordinary skill in the art would understand that the client 502 can be a client 204 as shown in FIG. 2 and that the storage device 504 can be a file server 206 shown in FIG. 2.

While the method 500 is described as using a client 502, any suitable computing device capable of communicating with the storage device 504 may be used. Client 502 utilizes services of the storage device 504 to store and manage data, such as, for example, files on a storage media 508, which can be a set of mass storage devices, such as magnetic or optical storage based disks or tapes. As used herein, the term "file" encompasses a container, an object, or any other storage entity. Interaction between the client 502 and the storage device 504 can enable the provision of storage services. That is, the client 502 may request the services of the storage device 504 and the storage device 504 may return the results of the services requested by the client 502, by exchanging packets over the connection system (not shown in FIG. 5). The client 502 may issue packets using file-based access protocols, such as the Common Internet File System (CIFS) protocol or the Network File System (NFS) protocol, over the Transmission Control Protocol/Internet Protocol (TCP/IP) when accessing information in the form of files and directories. Alternatively, the client 502 may issue packets including block-based access protocols, such as the Small Computer Systems Interface (SCSI) protocol encapsulated over TCP (iSCSI) and SCSI encapsulated over Fibre Channel (FCP), when accessing information in the form of blocks. The client 502 executes one or more host applications (not shown in FIG. 5).

The storage device 504 includes a storage manager 506 and a data storage media 508. In a preferred embodiment, the storage manager 506 is the file system layer 430 of the storage operating system 314 as shown in FIG. 4. Referring back to FIG. 5, a command with associated inputs (e.g., the source file name) to manipulate data is created at the client 502 (step 510) and the client 502 sends the command over the network to the storage manager 506 in the storage device 504 (step 512). The storage manager 506 unpacks the command and the associated inputs (step 514) and requests a source file from the storage media 508 that contains the data to be manipulated (step 516). The storage media 508 retrieves the source file (step 518) and the storage manager 506 reads the source file (step 520). The storage manager 506 manipulates the requested data from the source file as specified by the instructions in the command (step 522) and writes the manipulated data back to the storage media 508 (step 524). The storage manager 506 then sends the manipulation result back over the network to the client 502 (step 526).

One specific example of using the method 500 is in connection with Internet-based electronic mail. In these scenarios, electronic mail folders are often stored as single files, where each file contains all of the concatenated mail messages. When a user deletes a message, it is simply marked as "deleted" in the file. At a later time, the files need to be "repacked" in order to reclaim the space freed by the deleted messages.

A file repacking method 600 (described in connection with FIG. 6) can assist in repacking these files. The mail repacking application (not shown in FIG. 6), which is executed at a client 602, sends a list of valid offsets, the source file name, and destination file name to operate on to a storage device 604. The storage device 604 reads the list of offsets from the source file and copies the data from those offsets to the specified destination file. Once the entire list of offsets is processed, the storage device 604 returns an indication of success or failure to the client 602. The mail application can then update its internal system for tracking individual mail messages to reflect the newly packed file and delete the old file. Those of skill in the art would understand that client 602 can correspond to client 502 shown in FIG. 5; that storage device 604 can correspond to storage device 504; that data storage media 608 can correspond to data storage media 508; and that storage manager 606 can correspond to storage manager 506.

Figure 6:
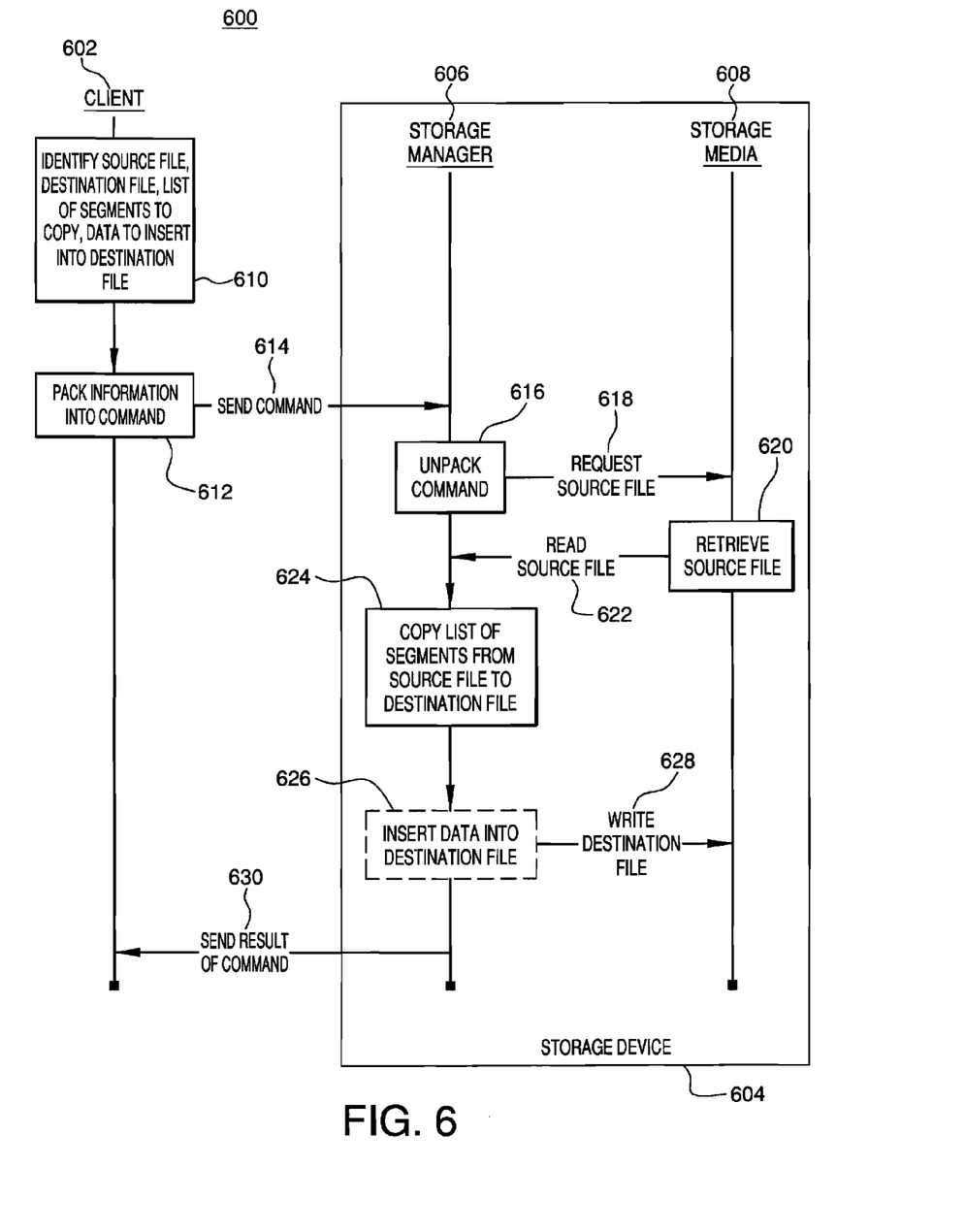
FIG. 6 is a flow diagram of a method for file repacking to be performed on a storage device.

Sending a list of commands to the storage device 604 to repack the data directly on the storage device 604 provides the following advantages: the amount of data sent to the storage device 604 is small (only the commands are sent, and not the data), the storage device 604 can optimize the set of instructions and execute them in an efficient manner, and no protocol overhead is needed because the data is never moved off the storage device 604.

FIG. 6 is a flow diagram of a method 600 for file repacking to be performed on the storage device 604. The method 600 utilizes the client 602 and the storage device 604, which communicate with each other over a network connection. While the method 600 is described as using a client 602, any suitable computing device capable of communicating with the storage device 604 may be used. The storage device 604 includes a storage manager 606 and a data storage media 608. The client 602 identifies the source file to be repacked, the destination file, a list of segments in the source file to copy to the destination file, data to be inserted into the destination file (this inserted data is optional), and regions to skip in the destination file (holes) (step 610). It is noted that in the example of the mail repacking application, the client 602 identifies this information by using information already maintained by the mail repacking application. As noted above, a benefit of the method 600 is to transfer processing from the client 602 to the storage device 604; the basic operation of the underlying mail repacking application is not changed. One reason that a user may want to leave holes in the destination file is to leave space to write metafile information, such as the number of records, the time of the repacking, and similar information which would be useful at a later time. The client 602 then packs the information into a command (step 612).

Each command executed by the method 600 may consist of a single call to the storage device 604 that contains all the details to repack a file, such as the list of segments to be copied, any data to be inserted into the destination file, and any regions to skip in the destination file. It is noted that the list of segments to be copied from the source file to the destination file could alternatively be a list of segments from the source file that are not to be copied to the destination file, wherein all other segments of the source file are to be copied to the destination file. The choice is implementation-specific and does not affect the general operation of the method 600. Whether the list of segments indicates segments to include or segments to exclude from the destination file can be indicated by a flag, for example. One skilled in the art can readily identify other types of indicators for identifying these segments; all such indicators are within the scope of the present invention.

Furthermore, if the list of segments indicates a list of segments to be included in the destination file, a particular ordering for the inclusion list could be specified, whereby the segments in the destination file would be reordered from how the segments appear in the source file. For purposes of discussion of the method 600, the list of segments includes a list of segments to copy from the source file to the destination file.

The client 602 sends the packed command over the network to the storage manager 606 in the storage device 604 (step 614). The storage manager 606 unpacks the command (step 616) and requests a source file from the storage media 608 (step 618). The storage media 608 retrieves the source file (step 620) and the storage manager 606 reads the source file (step 622). The storage manager 606 copies the segments from the list of segments of the source file to the destination file (step 624).

The storage manager 606 can choose to reorder and optimize the set of instructions in the command. Whether the instructions are reordered depends on the implementation and the layout of the data. For example, data can be pre-fetched for the next instruction while the current instruction is in progress. The storage manager 606 knows best how to execute the instructions. The client 602 does not know where the data is physically located in the storage media 608. However, the storage manager 606 knows where the data is located in the storage media 608, and can use this information to accelerate the method 600. For example, the storage manager 606 could read blocks out of the order specified in the file repacking command in order to obtain better performance from the storage device 604.

If additional data was provided (in step 610) to be inserted into the destination file, the storage manager 606 inserts the data (step 626; this optional step is shown in dashed outline). The storage manager 606 writes the destination file to the storage media 608 (step 628). The storage manager 606 then sends the result of the file repacking command back over the network to the client 602 (step 630).

Figure 7:
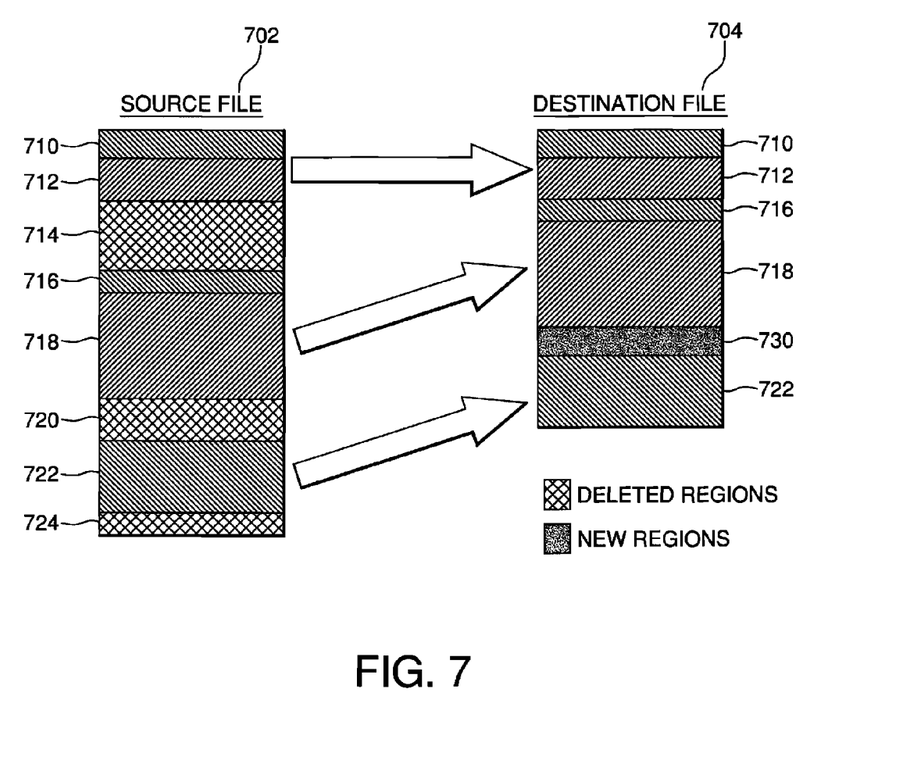
FIG. 7 is a diagram of a data file that is repacked according to the method shown in FIG. 6.

FIG. 7 is a diagram of a data file that is repacked according to the method shown in FIG. 6. A source file 702 includes a plurality of data segments 710, 712, 716, 718, 722, and several regions to be deleted 714, 720, 724. The method 600 copies the data segments 710, 712, 716, 718, 722 to a destination file 704, removes the regions to be deleted 716, 720, 724, and adds new data 730 to the destination file 704.

Another example of using the method 500 is in connection with database table repacking. In one implementation, the client 502 may execute a database management system, such as Microsoft™ SQL Server, by Microsoft Corporation of Redmond, Wash. Databases within database management systems maintain tables as files which contain fixed-size records. When a record is deleted, it is simply marked as "deleted" and is removed from the table index. Periodically, databases repack the table file to improve performance and to free up space held by deleted records. In particular, the repacking method 600 can also be used for repacking database tables. As described using the components shown in FIG. 6, the database management system generates a range of valid offsets in each table file (step 610) and sends the range of offsets to the storage device 604 (step 614). The storage device 604 uses the list of offsets to repack the table file (steps 616-624). Once completed, the database can update its indices and delete or archive the old table file.

While the method 600 was described in connection with repacking a file, other IO commands can be performed using a similar method, as generally shown by the method 500. The other IO commands can include, but are not limited to, the commands shown in Table 1.

TABLE 1

| | IO Commands |
|---|---|
| Command | Corresponding Inputs |
| read | file, offset, length of read |
| write | file, offset, length of write |
| resize | file, offset |
| delete | file |
| rename | file1, file2 |
| relocate | file1, offset, length of read, file2, offset, length of write |

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method, comprising:
receiving at a storage server a repacking command in a network storage communication protocol, from a client device executing a host application, the repacking command having been generated at the client device by the client device having incorporated a plurality of ordered instructions into the repacking command, the repacking command identifying a source data set and a destination data set stored at the storage server, the source data set occupying a plurality of file system level segments,
wherein each of the plurality of instructions includes instructions to manipulate the destination data set using at least one of the plurality of file system level segments of the source data set at the storage server, and each instruction includes information identifying at least one of the file system level segments in such a manner that no mapping function is needed to unambiguously ascertain each of said file system level segments of the source data set from the repacking command;
wherein the destination data set is a copy of the source data set and the repacking command causes the storage server to reclaim unused storage space, such that the destination data set occupies a smaller number of segments than the source data set;

accessing at the storage server the plurality of instructions in the repacking command;

reordering the plurality of instructions in the storage server to improve a performance of the plurality of instructions;

manipulating the destination data set using at least one of the file system level segments of the source data set at the storage server in response to receiving the repacking command, without transferring data of the destination data set or the source data set to the client device, by executing the plurality of instructions in the storage server, wherein the manipulating comprises:

for each instruction:
retrieving the at least one of the file system level segments of the source data set from a storage media of the storage server;
inserting data of the at least one of the file system level segments of the source data set to the destination data set stored in the storage server; and
in an event the repacking command includes an instruction to remove a file system level segment of destination data set, removing the file system level segment from the destination data set stored in the storage server; and sending a result of the repacking command from the storage server to the client device.

2. The method according to claim 1, wherein the storage server is a file server.

3. The method according to claim 1, wherein the plurality of instructions are included in the repacking command in an order, the method further comprising:
determining a reordering of the plurality of instructions by the storage server to improve a performance of the plurality of instructions, prior to executing the instructions according to the reordering.

4. The method according to claim 1, further comprising sending a result of the copying step from the storage server to the client.

5. The method of claim 1, wherein the source data set contains a first number of file system level segments, and wherein the repacking command is for repacking the destination data set at the storage server into a second number of file system level segments smaller than the first number of file system level segments.

6. The method according to claim 1, wherein each of said file system level segments of the source data set contains data of a portion of the source data set, but not data of the entire source data set.

7. A method, comprising:
receiving at a storage server a repacking command from a client over a network, the repacking command having been generated by the client and including information identifying a source file at the storage server and a destination file stored at the storage server, the repacking command further including a plurality of ordered instructions;
wherein each of the plurality of instructions includes instructions to manipulate the destination file using at least one of a plurality of file system level segments for the storage server, and each instruction includes information identifying at least one of the plurality of file system level segments to copy from the source file to the destination file in such a manner that no mapping function is needed to unambiguously ascertain each of said file system level segments from the repacking command;
wherein the destination file is a copy of the source file and the repacking command causes the storage server to reclaim unused storage space, such that the destination file occupies a smaller number of segments than the source file; and
at the storage server, copying file system level segments identified in the information from the source file to the destination file, in response to the plurality of instructions, without transferring any portion of the source file or the destination file to the client, wherein the copying comprises:
accessing at the storage server the plurality of instructions in the repacking command;
reordering the plurality of instructions in the storage server to improve a performance of the plurality of instructions;
manipulating the destination file using at least one of the file system level segments of the source file at the storage server in response to receiving the repacking command, without transferring data of the destination file or the source file to the client device, by executing the plurality of instructions in the storage server, wherein the manipulating comprises:
for each instruction:
retrieving the at least one of the file system level segments of the source file from a storage media of the storage server;
inserting data of the at least one of the file system level segments of the source file to the destination file stored in the storage server; and
in an event the repacking command includes an instruction to remove a file system level segment of destination file, removing the file system level segment from the destination file stored in the storage server; and
sending a result of the repacking command from the storage server to the client.

8. The method according to claim 7, wherein:
the repacking command further includes an exclusion list of file system level segments in the source file to exclude from the destination file; and
the copying step includes copying all file system level segments from the source file to the destination file except for those file system level segments in the exclusion list.

9. The method according to claim 7, wherein:
the copying step includes unpacking the information from the repacking command.

10. The method according to claim 7, wherein the repacking command further includes data to be inserted into the destination file, the method further comprising the step of:
writing the data to the destination file, the writing step being performed by the storage server.

11. The method according to claim 7, wherein the storage server includes a storage manager and a storage media and the copying step includes:
requesting the source file from the storage media by the storage manager;
retrieving the source file by the storage media;
reading the source file by the storage manager;
copying the file system level segments indicated in a list of file system level segments included in the repacking command by the storage manager from the source file to the destination file; and writing the destination file from the storage manager to the storage media.

12. The method according to claim 7, wherein the plurality of instructions are included in the repacking command in an order, the method further comprising:
   determining, by the storage server, a reordering of the plurality of instructions in the repacking command, and executing the plurality of instructions in the storage server according to the reordering.

13. The method according to claim 12, wherein the repacking command includes parameters to execute the repacking command on the storage server, and the performing step includes:
   accessing the parameters after unpacking the repacking command; and
   using the parameters to execute the repacking command.

14. The method according to claim 12, wherein the repacking command specifies the data set, and the manipulating step includes:
   retrieving the source data set from the storage media; and
   execute the repacking command on the destination data set.

15. The method according to claim 12, wherein the storage server includes a storage manager and a data storage media, the manipulating step including:
   manipulating the source data set by the storage manager, the storage manager accessing the storage media to manipulate the source data set.

16. The method according to claim 15, wherein the manipulating step includes:
   requesting the source data set from the storage media by the storage manager;
   retrieving the source data set by the storage media;
   reading the source data set by the storage manager;
   manipulating the destination data set from the file by the storage manager according to the plurality of instructions in the repacking command;
   writing the manipulated destination data set back to the storage media by the storage manager; and
   sending a result of the manipulating step from the storage manager to the client.

17. The method of claim 7, the repacking command having been generated by the client prior to receiving the repacking command being received at the storage server, by the client having autonomously determined the plurality of instructions to incorporate into the repacking command, without the plurality of instructions having been specified for the repacking command by a human user.

18. A storage server, comprising:
   a storage adapter through which to access a set of storage media of the storage server;
   a network adapter through which to receive a network file system protocol repacking command over a network from a client, the repacking command having been generated by the client to include information identifying a source file at the storage server and a destination file stored at the storage server, the repacking command further including a plurality of ordered instructions;
   wherein each of the plurality of instructions includes instructions to manipulate the destination file using at least one of a plurality of file system level segments for the storage server, and each instruction includes information identifying at least one of the plurality of file system level segments for the storage server to copy from the source file to the destination file in such a manner that no mapping function is needed to unambiguously ascertain each of said file system level segments from the repacking command,
   wherein the destination file is a copy of the source file and the repacking command causes the storage server to reclaim unused storage space, such that the destination file occupies a smaller number of segments than the source file; and
   a processor coupled to the storage adapter and the network adapter and configured to copy file system level segments identified in the information in the command from the source file to the destination file at the storage server, in response to the plurality of instructions without transferring any portion of the source file or the destination file to the client, wherein the copying comprises:
      access at the storage server the plurality of instructions in the repacking command;
      reorder the plurality of instructions in the storage server to improve a performance of the plurality of instructions;
      manipulate the destination file using at least one of the file system level segments of the source file at the storage server in response to receiving the repacking command, without transferring data of the destination file or the source file to the client, by executing the plurality of instructions in the storage server, wherein the manipulating comprises:
      for each instruction:
         retrieving the at least one of the file system level segments of the source data set from a storage media of the storage server;
         inserting data of the at least one of the file system level segments of the source data set to the destination data set stored in the storage server; and
         in an event the repacking command includes an instruction to remove a file system level segment of destination data set, removing the file system level segment from the destination data set stored in the storage server; and
      send a result of copying the file system level segments identified in the list to said client.

19. The storage server according to claim 18, further comprising a storage manager and a data storage media, wherein said storage manager is configured to:
   receive the identified information;
   request the source file from said storage media;
   read the source file from said storage media;
   copy the list of file system level segments from the source file to the destination file;
   write the destination file to said storage media; and
   send the result of the copying to said client.

20. The storage server according to claim 19, wherein:
   said repacking command further includes information identifying data to be inserted into the destination file; and
   said processor is further configured to insert the identified data to the destination file.

21. A storage server, comprising:
   a storage adapter through which to access a set of storage media of the storage server;
   a network adapter through which to receive a repacking command identifying a source data set and a destination data set stored at the storage server from a client via a network, the repacking command having been generated by the client, by the client having incorporated a plurality of ordered instructions into the repacking command, the source data set occupying a plurality of file system level segments, and each instruction includes information identifying at least one of the file system level segments in such a manner that no mapping function is needed to unambiguously ascertain each of said file system level segments of the source data set from the repacking command, wherein the destination data set is a copy of the source data set and the repacking command causes the storage server to reclaim unused storage space, such that the destination data set occupies a smaller number of segments than the source data set; and a processor coupled to the storage adapter and the network adapter and configured to control the storage server to provide network storage services to the client, including controlling the storage server to accessing the plurality of instructions in the repacking command;

reordering the plurality of instructions in the storage server to improve a execution of the repacking command; and manipulating the destination data set using at least one of the file system level segments of the source data set at the storage server in response to the repacking command, without transferring data of the destination data set or the source data set to the client, by executing the plurality of instructions, wherein the manipulating comprises:

for each instruction:
retrieving the at least one of the file system level segments of the source data set from a storage media of the storage server;
inserting data of the at least one of the file system level segments of the source data set to the destination data set stored in the storage server; and
in an event the repacking command includes an instruction to remove a file system level segment of destination data set, removing the file system level segment from the destination data set stored in the storage server; and sending a result of the repacking command from the storage server to the client device.

22. The storage server according to claim 21, wherein the storage server is a file server.

23. The storage server according to claim 21, wherein the repacking command includes parameters to execute the repacking command, and the processor is further configured to:
access the parameters after unpacking the repacking command; and
use the parameters to execute the repacking command.

24. The storage server according to claim 21, wherein the command specifies the data set, and the processor executes the repacking command by:
retrieving the source data set from the storage media; and
executing the repacking command on the destination data set.

25. The storage server according to claim 21, wherein the processor is configured to:
request the source data set from the storage media by the storage manager;
retrieve the source data set by the storage media;
read the source data set by the storage manager;
manipulate the data from the destination data set by the storage manager according to the repacking command;
write the repacked data set back to the storage media by the storage manager; and
send a result of the repacking command from the storage manager to the client.

26. The storage server according to claim 21, wherein at least one of the plurality of instructions is from the group consisting of: copying a file, reading a file, writing a file, resizing a file, deleting a file, renaming a file, and relocating a file.

27. The storage server of claim 21, wherein the source data set occupies a first number of file system level segments at the storage server, and wherein the repacking command is for repacking the destination data set at the storage server into a second number of file system level segments smaller than the first number of file system level segments.

28. The storage server according to claim 21, wherein the manipulating comprises:
retrieving the at least one of the file system level segments of the source data set from a storage media of the storage server;
inserting data of the at least one of the file system level segments of the source data set to the destination data set stored in the storage server; and
if the repacking command includes an instruction to remove a file system level segment of destination data set; remove the file system level segment from the destination data set stored in the storage server.

29. A method, comprising:
creating in a client device a network storage communication protocol repacking command for a storage server that provides network storage services to the client device, by the client device incorporating into the repacking command a plurality of ordered instructions to be executed by the storage server, the repacking command identifying a source data set and a destination data set managed by the storage server, the source data set occupying a plurality of file system level segments at the storage server,
wherein each instruction includes information identifying at least one of the file system level segments in such a manner that no mapping function is needed to unambiguously ascertain each of said file system level segments of the source data set from the repacking command;
wherein the destination data set is a copy of the source data set and the repacking command causes the storage server to reclaim unused storage space, such that the destination data set occupies a smaller number of segments than the source data set;
sending the repacking command from the client device over a network to the storage server, to cause the storage server to access the plurality of instructions in the repacking command and manipulate the destination data set using at least one of the file system level segments according to the plurality of instructions;
wherein the plurality of instructions are reordered in the storage server to improve a performance of the plurality of instructions;
wherein the manipulating comprises:
for each instruction:
retrieving the at least one of the file system level segments of the source data set from a storage media of the storage server;
inserting data of the at least one of the file system level segments of the source data set to the destination data set stored in the storage server; and
in an event the repacking command includes an instruction to remove a file system level segment of destination data set, removing the file system level segment from the destination data set stored in the storage server; and receiving at the client device from the storage server a result of the storage server having executed the repacking command.

30. The method according to claim 29, wherein the storage server is a file server.

31. The method according to claim 29, wherein creating the repacking command further comprises including parameters in the data manipulation repacking command, for use by the storage server in executing the repacking command.

32. The method according to claim 29, wherein the repacking command specifies a destination data set on which the data manipulation command is to be performed.

33. The method according to claim 29, wherein at least one of the plurality of instructions is from the group consisting of: copying a file, reading a file, writing a file, resizing a file, deleting a file, renaming a file, and relocating a file.

34. The method of claim 29, wherein the source data set occupies a first number of file system level segments at the storage server, and wherein the repacking command is for repacking the destination data set at the storage server into a second number of file system level segments smaller than the first number of file system level segments.

35. A method, comprising:
receiving at a storage server a repacking command in accordance with a network storage communication protocol, from a client device executing a host application, the repacking command having been generated by the client device, by the client device having incorporated a plurality of ordered instructions into the repacking command, the repacking command identifying a source data set and a destination data set stored at the storage server, the source data set occupying a plurality of file system level segments at the storage server,
wherein each of the plurality of instructions includes instructions to manipulate the destination data set using at least one of the plurality of file system level segments of the source data set at the storage server, and each instruction includes information identifying at least one of the file system level segments in such a manner that no mapping function is needed to unambiguously ascertain each of said file system level segments of the source data set from the repacking command;
wherein the destination data set is a copy of the source data set and the repacking command causes the storage server to reclaim unused storage space, such that the destination data set occupies a smaller number of segments than the source data set;
accessing by the storage server the plurality of instructions in the repacking command;
determining by the storage server a reordering of the plurality of instructions relative to an ordering of the instructions in the repacking command;
reordering the plurality of instructions in the storage server according to the reordering to improve a performance of the plurality of instructions; and
manipulating the destination data set using at least one of the file system level segments of the source data set at the storage server in response to receiving the repacking command, without transferring data of the destination data set or the source data set to the client device, by executing the plurality of instructions in the storage server according to the reordering, wherein the manipulating comprises:
for each instruction:
retrieving the at least one of the file system level segments of the source data set from a storage media of the storage server;
inserting data of the at least one of the file system level segments of the source data set to the destination data set stored in the storage server; and
in an event the repacking command includes an instruction to remove a file system level segment of destination data set, removing the file system level segment from the destination data set stored in the storage server; and
sending a result of the repacking command from the storage server to the client device.

36. The method of claim 35, wherein the source data set occupies a first number of file system level segments at the storage server, and wherein the repacking command is for repacking the destination data set into a second number of file system level segments smaller than the first number of file system level segments.

* * * * *